(12) United States Patent
Lin et al.

(10) Patent No.: US 6,597,077 B2
(45) Date of Patent: Jul. 22, 2003

(54) STATOR COIL T-CONNECTION FOR TWO-PHASE STEP MOTORS

(76) Inventors: Ted T. Lin, 12307 Crayside La., Saratoga, CA (US) 95070; Ryan C. Lin, 12307 Crayside La., Saratoga, CA (US) 95070

( * ) Notice: Subject to any disclaimer, the term of this patent is extended or adjusted under 35 U.S.C. 154(b) by 0 days.

(21) Appl. No.: 09/998,533

(22) Filed: Nov. 29, 2001

(65) Prior Publication Data

US 2003/0102760 A1 Jun. 5, 2003

(51) Int. Cl.[7] .................... H02K 37/14; H02K 37/00; H02P 8/00
(52) U.S. Cl. .................... 310/49 R; 310/180; 310/184; 318/696
(58) Field of Search .............. 310/49 R, 179, 310/180, 184, 189, 200; 318/696

(56) References Cited

U.S. PATENT DOCUMENTS

| | | | | |
|---|---|---|---|---|
| 3,466,518 A | | 9/1969 | Aylikci et al. .............. 318/138 |
| 3,629,636 A | * | 12/1971 | Hill .............................. 310/184 |
| 4,127,801 A | * | 11/1978 | Leenhouts .................. 318/696 |
| 4,164,696 A | * | 8/1979 | Kastilahn et al. ........... 318/696 |
| 4,584,495 A | * | 4/1986 | Kordik ...................... 310/49 R |
| 4,634,948 A | * | 1/1987 | Brigham ..................... 318/696 |
| 4,638,195 A | | 1/1987 | Lin ............................ 310/49 R |
| 4,684,860 A | * | 8/1987 | Heyraud et al. ............. 318/696 |
| 4,792,709 A | | 12/1988 | Smith et al. ............... 310/49 R |
| 5,270,597 A | | 12/1993 | Yubazaki et al. .......... 310/49 R |
| 5,406,185 A | | 4/1995 | Strunk ......................... 318/767 |
| 5,444,316 A | | 8/1995 | Ohya et al. ............... 310/49 R |
| 5,689,167 A | | 11/1997 | Vitunic ........................ 318/767 |
| 5,694,027 A | | 12/1997 | Satake et al. .................. 322/63 |
| 6,114,782 A | | 9/2000 | Lin et al. .................. 310/49 R |

FOREIGN PATENT DOCUMENTS

| | | |
|---|---|---|
| JP | 56-94959 | 7/1981 |
| JP | 11-122896 | 4/1999 |
| JP | 11-178308 | 7/1999 |

* cited by examiner

Primary Examiner—Burton S. Mullins
(74) Attorney, Agent, or Firm—Thomas Schneck; Mark Protsik

(57) ABSTRACT

A two-phase step motor with bifilar winding around the stator poles is connected to phases $\alpha$ and $\beta$ (90° apart) of a two-phase driver in a manner that maximizes torque at medium speed operation and minimizes vibrations. In particular, the coils that are wound around different groups of stator poles are connected in series. In one set, both coils are connected in a forward sense around the stator, while in the other set, the two coils are connected in opposite senses. All coils are energized in every phase of a pulse cycle. The properties are intermediate between that of convention series and parallel stator coil connections.

4 Claims, 6 Drawing Sheets

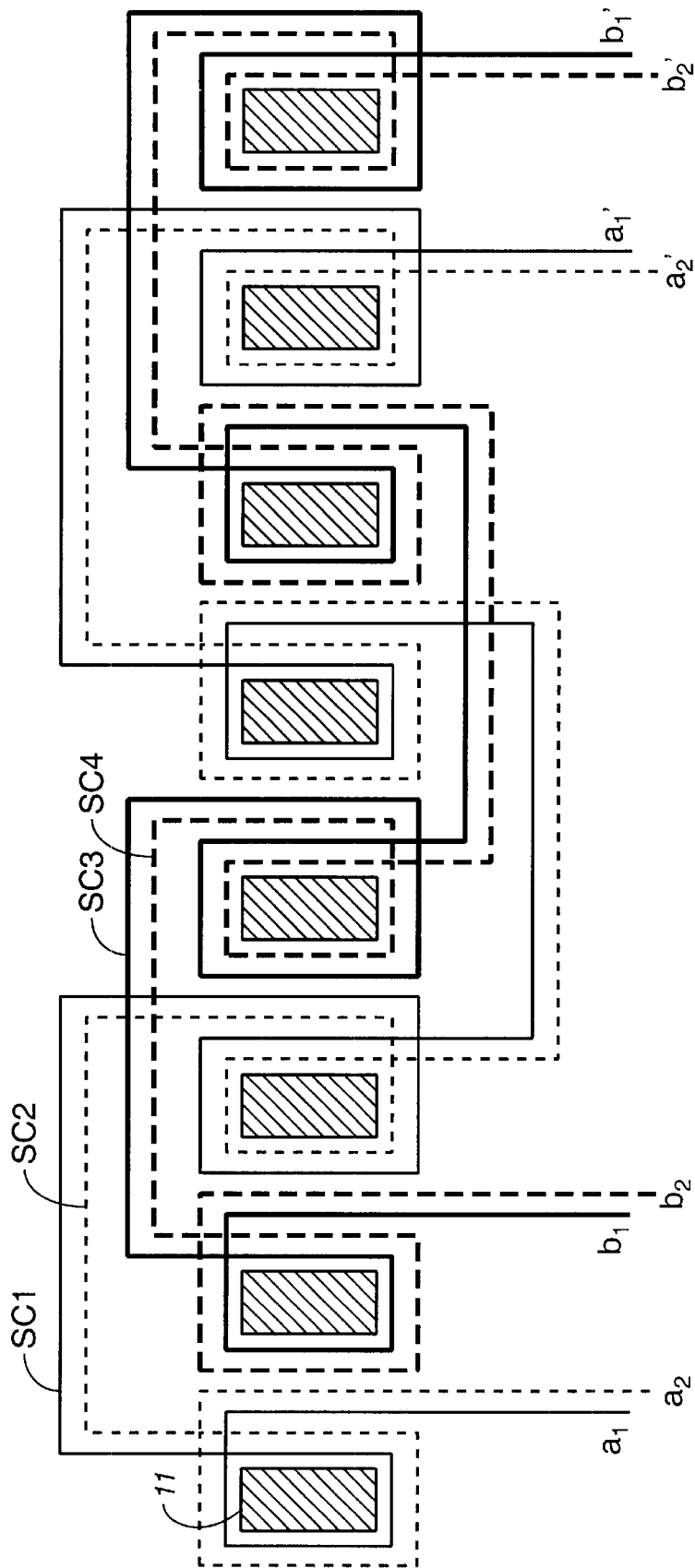
FIG._1A (PRIOR ART)

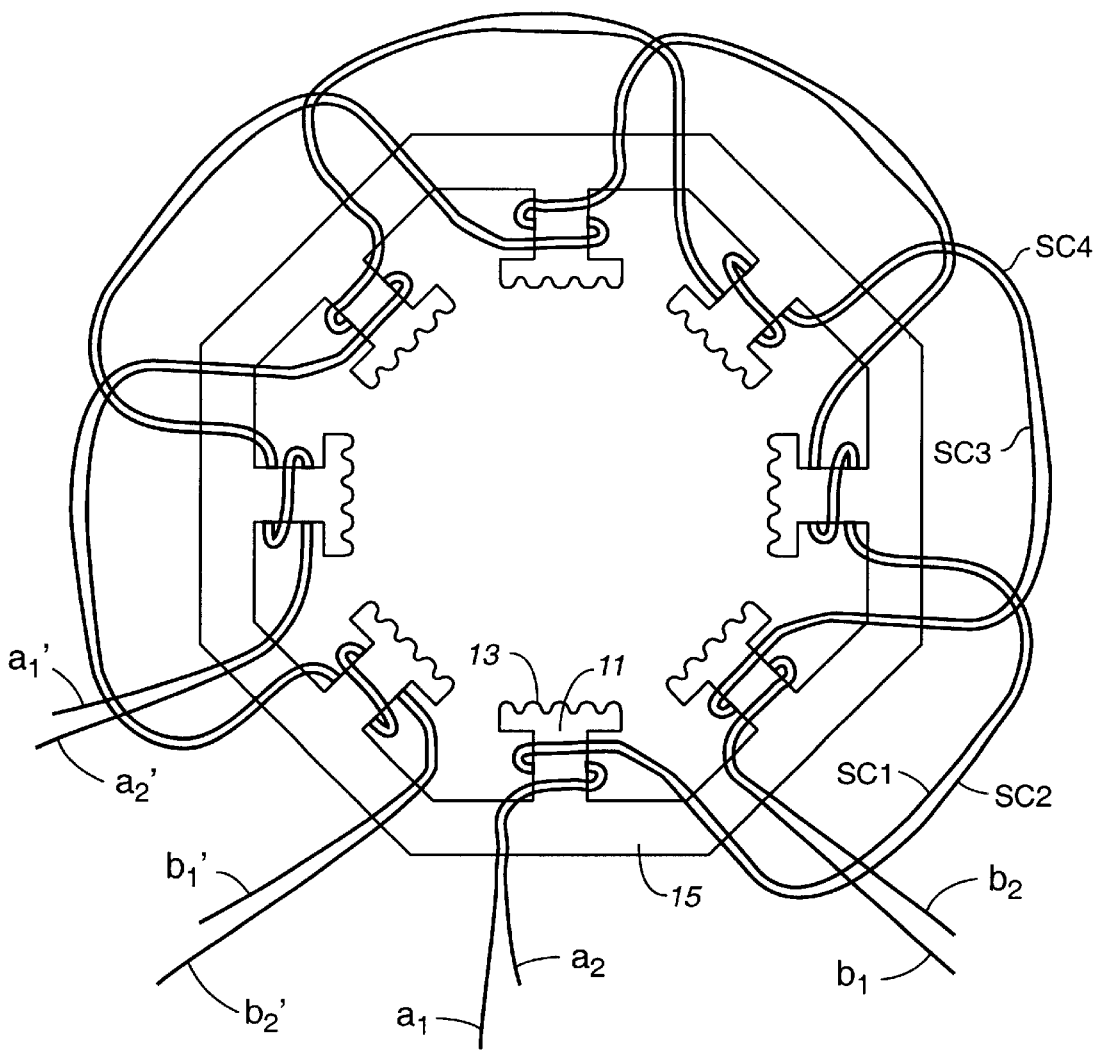
FIG._1B (PRIOR ART)
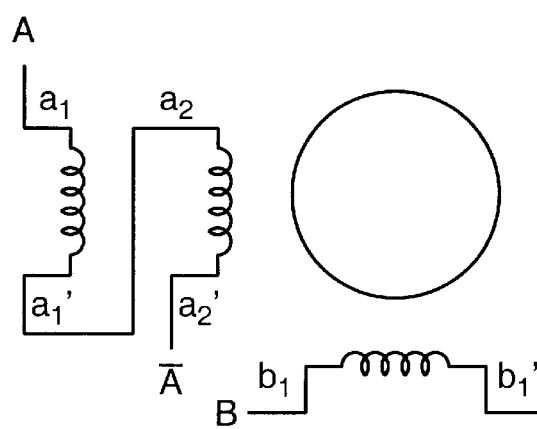
FIG._1C (PRIOR ART)

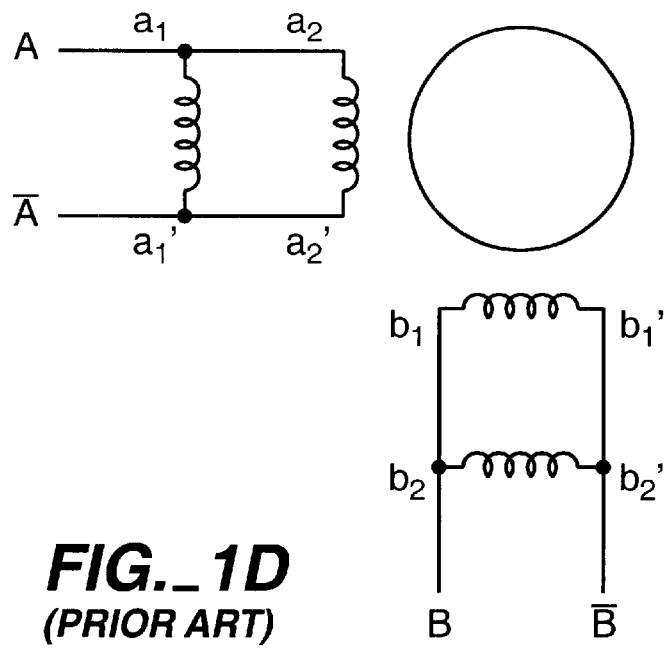
FIG._1D
*(PRIOR ART)*
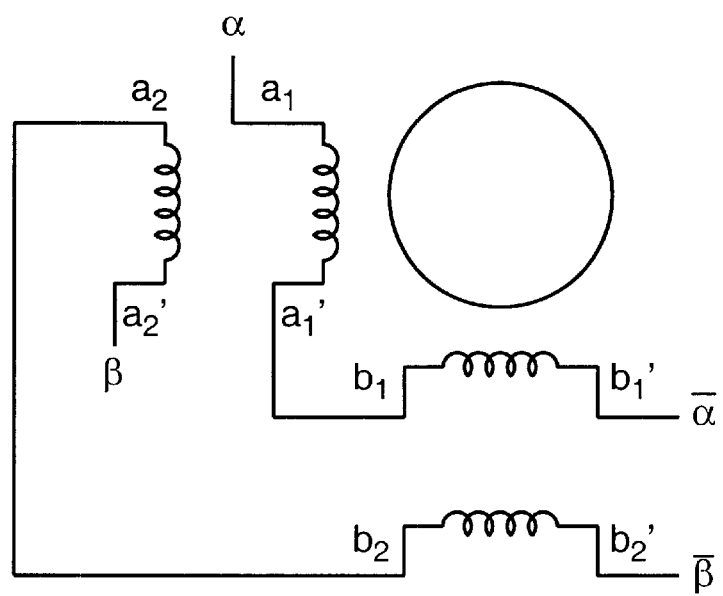
FIG._2

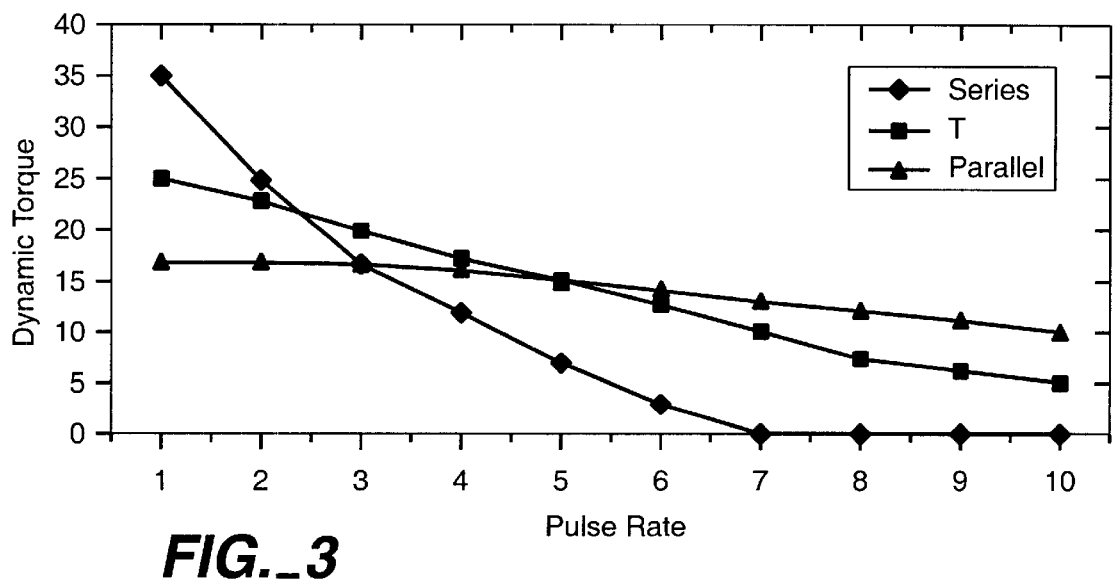
FIG._3
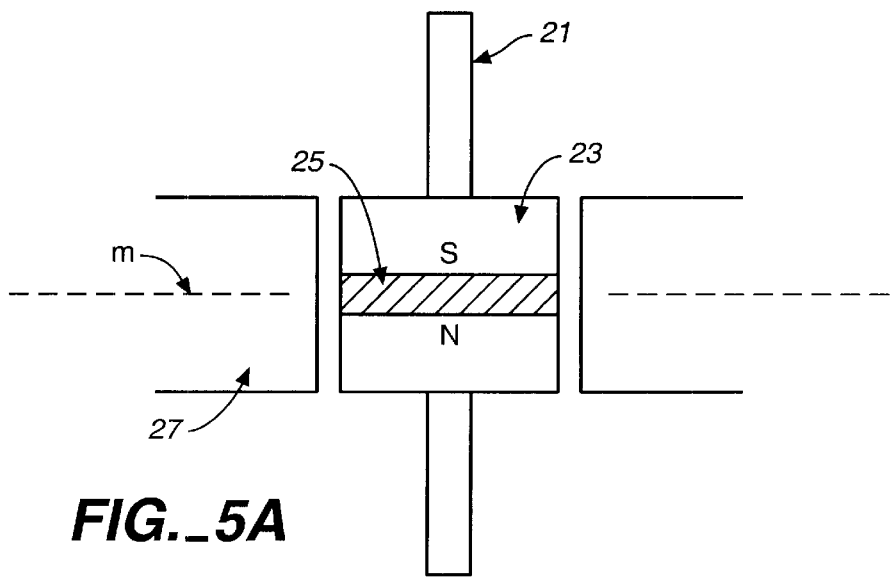
FIG._5A

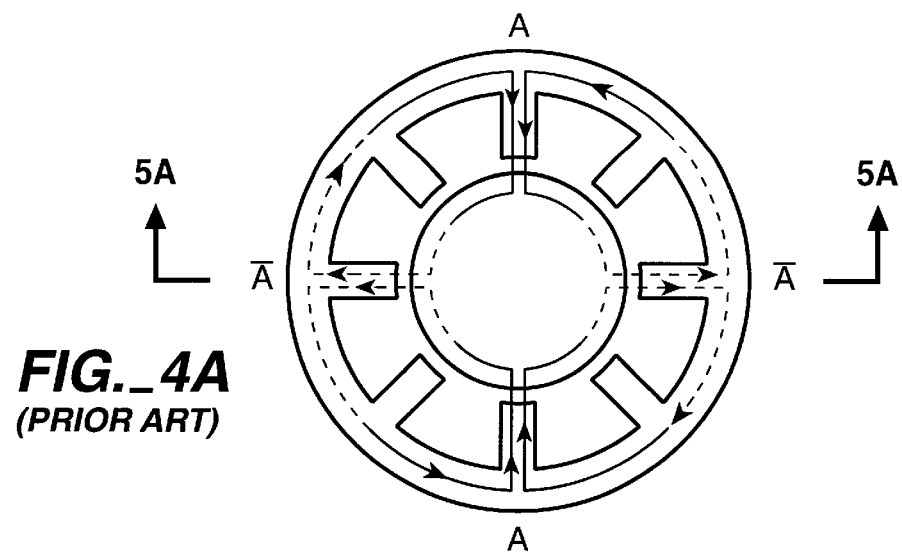
FIG._4A
(PRIOR ART)
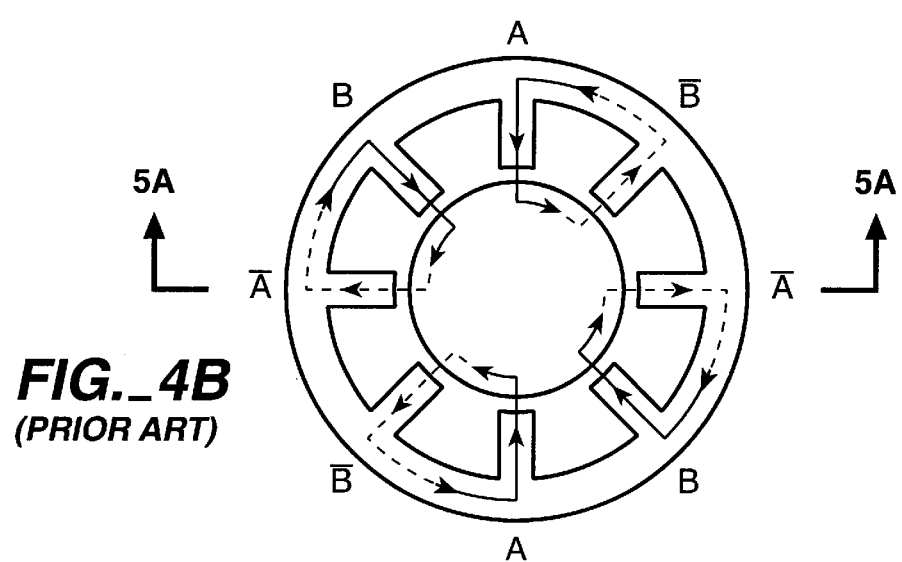
FIG._4B
(PRIOR ART)
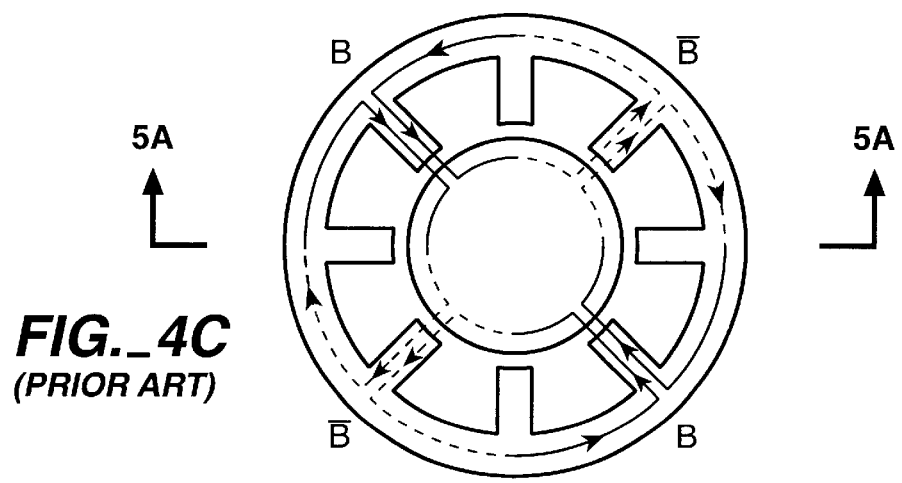
FIG._4C
(PRIOR ART)

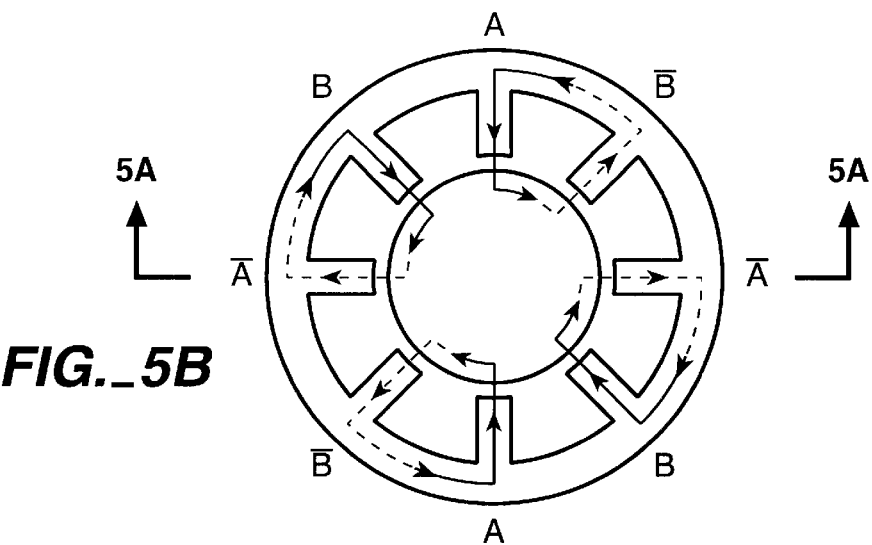
FIG._5B
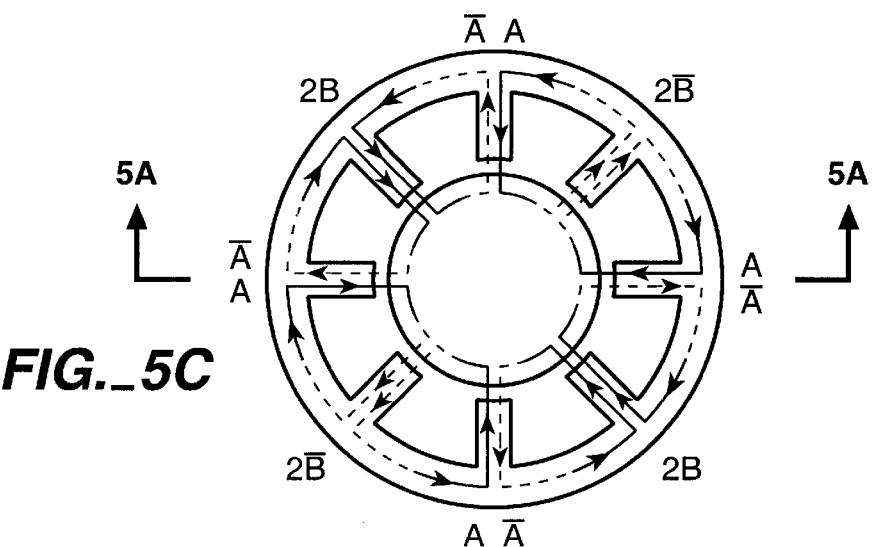
FIG._5C
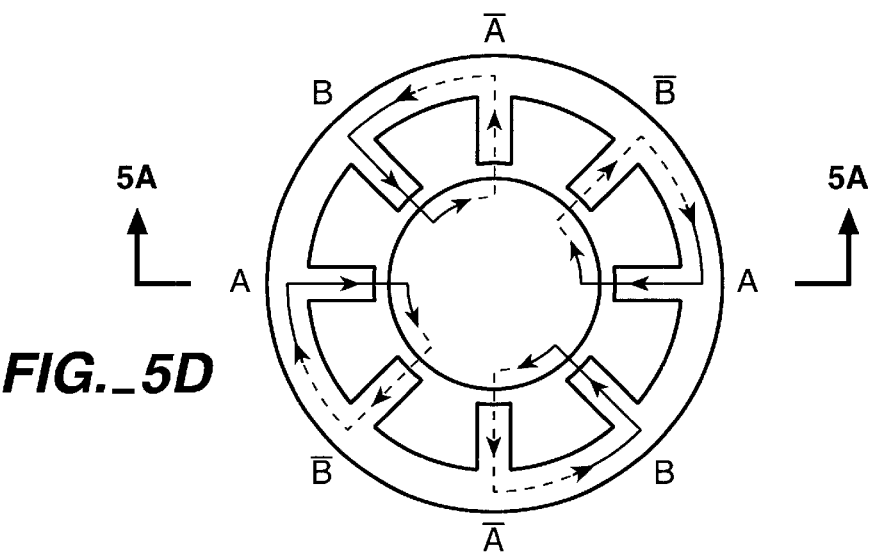
FIG._5D

STATOR COIL T-CONNECTION FOR TWO-PHASE STEP MOTORS

TECHNICAL FIELD

The present invention relates to two-phase electric step motors, and in particular relates to details of the stator coil-driver connections for maximizing torque or other motor performance characteristics at a given pulse rate or step speed.

BACKGROUND ART

Two-phase bipolar step motors are widely used for motion control applications. FIGS. 1A and 1B show a typical eight-pole stator of a two-phase step motor of the prior art. Mechanically, the motor (not shown) appears in actual implementation as a multi-tooth gear, and the stator poles have corresponding teeth that mesh with the rotor so as to permit many motor steps per revolution. The step resolution (the number of steps per revolution) of a step motor is determined by multiplying the number of rotor teeth by the number of mechanical phases. The number of mechanical phases are two-times the number of electrical phases in a bipolar device.

Electrically, four stator coils (SC1, SC2, SC3 and SC4) are wound around the eight stator poles in a specified manner. A bifilar winding pattern is used, meaning that the stator coils are wound around the poles in pairs. Thus, first and second stator coils SC1 and SC2 are paired throughout the winding, and likewise the third and fourth stator coils SC3 and SC4 are paired throughout the winding. Each stator coil is wound around every other stator pole in alternating clockwise and counterclockwise directions. The ends of the stator coil wires are designated $a_1$ and $a_1'$ for SC1, $a_2$ and $a_2'$ for SC2, $b_1$ and $b_1'$ for SC3, and $b_2$ and $b_2'$ for SC4. These coil ends can be connected together and to a driver circuit in any of several different ways.

FIG. 1C shows a series connection for the stator coils of FIGS. 1A and 1B. The end $a_1'$ of first stator coil SC1 connects to the end $a_2$ of second stator coil SC2, so that coils SC3 and SC4 are also connected in series. Ends $a_1$ and $a_2'$ form terminals connecting coils SC1 and SC2 to phase A of a two-phase driver. A reversed current through coils SC1 and SC2 having a 180° phase shift from phase A is designated as phase $\overline{A}$. Ends $b_1$ and $b_2'$ form terminals connecting coils SC3 and SC4 to phase B of the two-phase driver, wherein phases A and B have a 90° phase shift from each other. Again, a reversed current through coils SC3 and SC4 having a 180° phase shift from phase B is designated as phase $\overline{B}$. Motors with series connection work very well (maximize torque) for low speed applications.

FIG. 1D shows a parallel connection for the stator coils of FIGS. 1A and 1B. Here the stator coils SC1 and SC2 are connected in parallel at first ends $a_1$ and $a_2$ and also at second ends $a_1'$ and $a_2'$, the opposite ends forming terminals connected to phase A of a two-phase driver. Similarly, stator coils SC3 and SC4 are connected in parallel at first ends $b_1$ and $b_2$, and also at second ends $b_1'$ and $b_2'$, to form terminals connected to phase B of the two-phase driver, where phase B is a shifted 90° relative to phase A. Again, phases $\overline{A}$ and $\overline{B}$ designate a reversed current through the coils which are 180° out of phase relative to phases A and B, respectively. Motors with parallel connection work very well for high speed applications.

Neither the series connection nor the parallel connection of the stator coils work especially well (in terms of maximizing torque for a given rated current) at medium speed. Medium speed applications include surveillance cameras, printers, scanners, x-y tables, turn tables, CNC machines, dispensers, injector pumps, optical equipment and other precision devices. Many of these applications require smooth motion. Thus, in addition to torque, another relevant motor performance factor is motor noise or vibration, which is related to the magnetic flux path created by the stator coil and driver connections. It is desired to minimize vibration at operating speed of a two-phase motor, as well as maximizing torque at that speed. Medium speed refers to the pulse rate or speed of step motor operation at which neither series nor parallel connection performs significantly better than the other.

DISCLOSURE OF THE INVENTION

This objective of improved medium speed operation for two-phase step motors is achieved by a new stator coil and driver connection scheme, hereinafter called a T-connection. Unlike the prior connections in which the paired coils wound around the same group of poles were the ones connected together in series or parallel, in the present invention it is the coils wound around different poles that are connected together. The two stator coils in each set are connected in series, but in different ways for the two sets. In one set, both coils are connected in a forward sense around the stator, i.e. so current flows from pole to pole around the stator in the same direction for each of the two coils. In the other set, one of the coils is connected in series to the other in a reverse sense, i.e. so that the current flows from pole to pole around the stator in opposite directions for the two coils. The two sets of connected coils have terminals that connect to respective phases a and of a two-phase driver, where phase α and β are shifted 90° relative to each other. The properties of this T-connection are found to be intermediate between that of the prior series and parallel connections and are best suited of the three types to medium speed motor operation.

BRIEF DESCRIPTION OF THE DRAWINGS

FIGS. 1A and 1B are respectively a winding diagram and a top elevational view of a typical eight-pole two-phase step motor of the prior art. The winding pattern shown here of the stator coils (SC1, SC2, SC3 and SC4) about the stator poles of the motor is also used in a preferred embodiment of the present invention, but with different connections between the coils as demonstrated in FIGS. 1C, 1D and 2.

FIGS. 1C and 1D are electrical connection diagrams for the stator coils of a step motor as in FIGS. 1A and 1B for respective prior art serial and parallel connections of the coils to a two-phase driver.

FIG. 2 is an electrical connection diagram for the stator coils of a step motor as in FIGS. 1A and 1B for a T-connection of the coils to a two-phase driver in accord with the present invention.

FIG. 3 is a graph of relative dynamic torque versus relative pulse rate (arbitrary units) for series, T-connections, and parallel bipolar motors.

FIGS. 4A–4C show magnetic flux paths for prior art parallel and series connected motors at three states of the drive phases A, AB and B.

FIG. 5A is a schematic side sectional view of a stator and rotor.

FIGS. 5B–5D corresponding top plan views showing the magnetic flux paths for a T-connected motor of the present invention at three states of the drive phases α, αβ and β.

BEST MODE OF CARRYING OUT THE INVENTION

With reference to FIG. 2, the stator coil T-connection of the present invention connects sets of coils that are wound around different groups of stator poles. In the bifilar winding pattern in FIGS. 1A and 1B, the first and second stator coils SC1 and SC2 form a pair that is wound around a first group of poles, and the third and fourth stator coils SC3 and SC4 form another pair that is wound around a second group of poles different from the first group. Stator coils SC1 and SC3, from different pairs which are wound around different groups of poles, form a first connected set of coils that are connected together in series. Likewise, stator coils SC2 and SC4, again from different pairs which are wound around different groups of poles form a second connected set of coils that are connected together in series. This new T-connection differs from the conventional series connection shown in FIG. 1C in that there is a the paired coils wound around the same group of poles, namely coils SC1 and SC2, and likewise coils SC3 and SC4, that are connected together in series.

The manner of connecting the first set of coils SC1 and SC3 in the T-connection of the present invention differs from the manner of connection the second set of coils SC2 and SC4. In the first set of coils, the end $a_1'$ of first stator coil SC1 connects to the end $b_1$ of third stator coil SC3. Ends $a_1$ and $b_1'$ form terminals connecting coils SC1 and SC3 to a phase a of a two-phase driver. In the second set of coils, the end $a_2$ (not $a_2'$) of second stator coil SC2 connects to the end $b_2$ of fourth stator coil SC4. Ends $a_2'$ and $b_2'$ form terminals connecting coils SC2 and SC4 to a phase β of a two-phase drive, where β is shifted 90° relative to phase α. As per the previous convention, reverse current through the coils which are 180° out of phase relative to phases α and β is designated by phase $\overline{\alpha}$ and $\overline{\beta}$, respectively. From the view seen in FIG. 1B, the coil ends are given unprimed and primed designations such that the winding of the stator coils SC1-SC4 around their respective successive stator poles advance in the same direction around the stator, in this instance counterclockwise, in a forward sense from the unprimed ends $a_1$, $a_2$, $b_1$, and $b_2$ to the primed ends $a_1'$, $a_2'$, $b_1'$ and $b_2'$.

The prior art series and parallel connections shown in FIGS. 1C and 1D require that coils be connected so that current flows from terminal to terminal in the same sense through both coils of each connected pair. For example, in the series connection at some given instant of phase A current may flow from terminal $a_1$ to terminal $a_2'$, in which case it flows in a forward sense both through coil SC1 from and $a_1$, to end $a_1'$ and coil SC2 from end $a_2$ to end $a_2'$. In another example, for the parallel connection at some given instant of phase B current may flow in reverse from the terminal defined by connected ends $b_1'$ and $b_2'$ to the opposite terminal defined by connected ends $b_1$ and $b_2$, in which case the current flows in the same reverse sense through both coils SC3 and SC4. The requirement for same sense connection of stator coils in the prior art is dictated by the connected pair of coils being wrapped around the same set of stator poles. (Coils connected in an opposite sense would cancel each other out.)

In the new T-connection of the present invention, same sense connection is not required since the two connected coils of each set are wound around different groups of stator poles. Indeed, in the T-connection, one of the sets of connected coils has a same sense connection, while the other set has an opposite sense connection. In particular, as seen in FIG. 2, the first set of connected coils SC1 and SC3 is connected so that current flows in the same sense through both of them, either forward ($a_1$ to $a_1'$ then $b_1$ to $b_1'$) or in reverse ($b_1'$ to $b_1$ then $a_1'$ to $a_1$) depending on the particular instant in the cycle of phase α. However, unlike either of the prior connection schemes, the second set of connected coils SC2 and SC4 in the T-connection is connected so that current flows in opposite senses through the two coils. That is, during the positive part of the cycle for phase β in which current flows from terminal $a_2'$ to terminal $b_2'$, the current flows in reverse sense through coil SC2 from $a_2'$ to $a_2$ and in a forward sense through coil SC4 from $b_2$ to $b_2'$. Then during the negative part of the cycle for phase β in which current from terminal $b_2'$ to terminal $a_2'$, the current flows in the reverse sense through coil SC4 from $b_2'$ to $b_2$ and in the forward sense through coil SC2 from $a_2$ to $a_2''$.

The drive phase α and β comprise DC pulses with α and β being 90° out of phase from one another. The sequence of phase states in a pulse cycle when the motor is stepped continually, known as half-stepping is:

| time | alpha | beta |
|---|---|---|
| 0 | α(+), $\overline{\alpha}$(−) | 0 |
| T/8 | α(+), $\overline{\alpha}$(−) | β(+), $\overline{\beta}$(−) |
| T/4 | 0 | β(+), $\overline{\beta}$(−) |
| 3T/8 | α(−), $\overline{\alpha}$(+) | β(+), $\overline{\beta}$(−) |
| T/2 | α(−), $\overline{\alpha}$(+) | 0 |
| 5T/8 | α(−), $\overline{\alpha}$(+) | β(−), $\overline{\beta}$(+) |
| 3T/4 | 0 | β(−), $\overline{\beta}$(+) |
| 7T/8 | α(+), $\overline{\alpha}$(−) | β(−), $\overline{\beta}$(+) |
| T | same as t = 0 | same as t = 0 |

Here forward current flows from α(+) to $\overline{\alpha}$(−) through coils SC1 and SC3, while reverse current during another part of the cycle flows from $\overline{\alpha}$(+) to α(−) through coils SC1 and SC3. Likewise, current flows through coils SC2 and SC4 from plus (+) to minus (−) between terminals β to $\overline{\beta}$.

Electrical properties (resistance, inductance, etc.) of the T-connection are intermediate between that of the prior series and parallel connections. The series connection has two times the phase resistance and four times the phase inductance of a unipolar motor. The parallel connection has half the phase resistance and the same phase inductance of a unipolar motor. In order to keep the same heat dissipation (proportional to $R \cdot I^2$), the rated current per phase should be ($1/\sqrt{2}\, I_u$ for the series and T-connection and $\sqrt{2}\, I_u$ for the parallel bipolar motor, where $I_u$ is the unipolar motor current rating. However, for comparing torque, the same current powers each connection of the motor, chosen at the rated current per phase for the series connection. The relative holding torque for the case when one drive phase is on (1ø) and both drive phases are on (2ø) are shown in the following table:

| Connection | 1ø | 2ø |
|---|---|---|
| Series | 1 | $\sqrt{2}$ |
| T-connection | $1/\sqrt{2}$ | 1 |
| Parallel | ½ | $1/\sqrt{2}$ |

The relative dynamic torque at the same rated current as the series connection is shown in the graph in FIG. 3 for various pulse rates. Here it can be seen that the series connection is best for low pulse rates (≦2) and the parallel connection is best for high pulse rates (≧6). The T-connection is best for moderate pulse rates (3–5) and comparable to the best choice over a somewhat wider range (2–6). In particular, the T-connection, having a low L/R time constant, is good for a voltage drive (which requires a certain resistance to control the current) and also good for applications requiring low current input.

With reference to FIGS. 4A–4C and FIGS. 5A–5D, the unique magnetic flux path of the T-connected motor reduces motor noise and vibration. Noise and vibration are caused by magnetic force applied between the teeth of the stator and motor. A conventional two-phase motor design with series or parallel connection has noise and vibration problems because during that part of a driver cycle when only one phase is ON (FIGS. 4A and 4C), half of the poles are not energized, but when both phases are ON (FIG. 4B) all of the poles are energized. Strong magnetic absorption occurs when the unenergized poles of the one-phase ON operation becomes energized at the beginning of the two-phase ON operation (FIG. 4B). The strong magnetic force change causes poles and teeth to wiggle. Likewise, another strong magnetic force change occurs in the transition from the two-phase ON portion of the driver cycle to the one-phase ON portion. In contrast, in the present T-connection invention, because each drive phase α and β includes coils around every stator pole, each pole is always energized. As seen in FIG. 5A, a side view of the motor shows a rotor 23 mounted on a motor shaft 21. A centrally located permanent magnet 25 is sandwiched between upper and lower sections of the rotor 23. In this view, the north and south poles of the magnet 25 are aligned with the rotor axis defined by the shaft 21, with the magnet 25 located in a central plane through the rotor 23 and stator 27, seen as a middle line M. The north pole of the rotor magnet 25 is below the middle line M and the south pole is above the middle line M. The top views in FIGS. 5B–5D show the magnetic flux paths for three states of drive phase α and β, namely α on, αβ both on, and β on. Magnetic flux traveling above the middle line M in FIG. 5A is shown as a solid line, while magnetic flux traveling below the middle line M in FIG. 5A is shown as a dashed line in FIGS. 5B–5D. Even though both phases α and β are ON and current flows in opposite directions through coils would around the same poles (those poles indicated by $\overline{AA}$ in FIG. 5B), magnetic flux still passes around such poles (unlike FIG. 4C), with flux about and below the middle line M of FIG. 5A passing in opposite directions. Thus, the noise causing tendency of the poles and teeth to wiggle is reduced compared to prior connection schemes.

What is claimed is:

1. A two-phase step motor of the type having a stator with 4·n stator poles, n being a positive integer, four stator coils being wound around said stator poles in a bifilar winding pattern with first and second stator coils wound as a pair around a first group of every other stator pole in alternating clockwise and counterclockwise directions around each successive pole in that group and with third and fourth stator coils wound as a pair around a second group of every other stator pole, different from the first group, the step motor also having a rotor with a permanent magnet sandwiched between two rotor sections, the eight ends of the four stator coils being connected to a two-phase driver providing two sets of pulses in respective phase α and β that are 90° out of phase from each other so as to drive the rotor in steps, wherein the improvement is characterized in that:

the first and third stator coils are connected together in series such that current proceeds in both coils in the same sense around the poles of the stators, and the second and fourth stator coils are connected together in series such that current proceeds in these coils in opposite senses around the poles of the stators.

2. The motor of claim 1 wherein each of the stator poles have teeth on free ends thereof which mesh with corresponding teeth on the rotor.

3. The motor of claim 1 wherein $1 \leq n \leq 4$, and the number of stator poles is selected from any of 4, 8, 12 and 16.

4. A method of driving a step motor of the type having a stator with 4·n stator poles, n being a positive integer, four stator coils being wound around the stator poles in a bifilar winding pattern with first and second stator coils wound as a pair around, a first group of every other stator pole in alternating clockwise and counterclockwise directions around each successive pole in that group and with third and fourth stator coils wound as a pair around every other stator pole, different from the first group, the step motor also having a rotor with a permanent magnet aligned with a rotor shaft, the method comprising:

connecting the eight ends of the four stator coils to a two-phase driver, such that first and third stator coils are connected together in series to a phase α of the driver in a manner so that current pulses provided by the driver proceeds in both coils in the same sense around the poles of the stator, and such that second and fourth stator coils are connected together in series to a phase β of the driver in a manner so that current pulses provided by the driver proceeds in these coils in opposite senses around the poles of the stator;

driving the rotor in steps using the pulses from the two-phase driver, such that phase α and β are 90° out of phase from each other, pulses from each phase always energizing all stator poles in the stator.

* * * * *